(«12») United States Patent
Baumann

(10) Patent No.: US 11,695,341 B2
(45) Date of Patent: Jul. 4, 2023

(54) METHOD FOR OPERATING A DC-DC VOLTAGE CONVERTER APPARATUS AND CONTROL DEVICE FOR OPERATING A DC-DC VOLTAGE CONVERTER APPARATUS

(71) Applicant: Bayerische Motoren Werke Aktiengesellschaft, Munich (DE)

(72) Inventor: Martin Baumann, Hartenstein (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/583,304

(22) Filed: Jan. 25, 2022

(65) Prior Publication Data

US 2022/0247319 A1 Aug. 4, 2022

(30) Foreign Application Priority Data

Feb. 1, 2021 (DE) ..................... 10 2021 102 261.4

(51) Int. Cl.
*H02M 3/335* (2006.01)
*H02M 3/158* (2006.01)
(Continued)

(52) U.S. Cl.
CPC ......... *H02M 3/285* (2013.01); *H02M 1/0012* (2021.05); *H02M 1/0083* (2021.05); *H02M 3/33515* (2013.01); *H02M 3/1584* (2013.01)

(58) Field of Classification Search
CPC .. H02M 1/0012; H02M 3/157; H02M 3/1584; H02M 3/33515
See application file for complete search history.

(56) References Cited

U.S. PATENT DOCUMENTS

| 4,318,007 A | 3/1982 | Rizzi |
| 7,518,894 B2* | 4/2009 | Fosler ...................... H02J 1/08 |
| | | 363/72 |

(Continued)

FOREIGN PATENT DOCUMENTS

| CN | 103227466 A | 7/2013 |
| DE | 30 22 108 A1 | 1/1981 |

(Continued)

OTHER PUBLICATIONS

German-language Search Report issued in German Application No. 10 2021 102 261.4 dated Sep. 8, 2021 with partial English translation (ten (10) pages).

(Continued)

*Primary Examiner* — Gary A Nash
(74) *Attorney, Agent, or Firm* — Crowell & Moring LLP

(57) ABSTRACT

A method for operating a DC-DC voltage converter apparatus having a plurality of DC-DC voltage converter units connected in parallel in an electrical network is provided. The DC-DC voltage converter units are operated in a master/slave configuration based on current mode control in order to set a desired output voltage. Here, a reference voltage, to which the output voltage is intended to be adjusted, for the slave converters is determined by way of a preconditioning function according to a predetermined calculation specification from a master reference voltage prescribed by the master converter. Stable control can therefore be ensured even in the case of fluctuating loading at the respective DC-DC voltage converter units.

10 Claims, 3 Drawing Sheets

(51) Int. Cl.
*H02M 3/28* (2006.01)
*H02M 1/00* (2006.01)

(56) References Cited

U.S. PATENT DOCUMENTS

| 2014/0153294 | A1* | 6/2014 | Deboy | H02M 3/33573 |
| | | | | 363/21.04 |
| 2018/0233078 | A1* | 8/2018 | Park | H02M 1/36 |
| 2019/0157979 | A1* | 5/2019 | Higaki | H02M 3/28 |

FOREIGN PATENT DOCUMENTS

| DE | 10 2014 201 615 A1 | 7/2015 |
| DE | 11 2017 003 265 T5 | 3/2019 |
| DE | 10 2016 005 590 B4 | 6/2020 |
| KR | 10-1141038 B1 | 5/2012 |

OTHER PUBLICATIONS

Kutkut, Nasser H., et al., "Current Mode Control of a Full Bridge DC-to-DC Converter with a Two Inductor Rectifier", PESC97. Record 28$^{th}$ Annual IEEE Power Electronics Specialists Conference. Formerly Power Conditioning Specialists Conference 1970-71. Power Processing and Electronic Specialists Conference 1972, vol. 1, pp. 203-209, vol. 1, 1997 (seven (7) pages).

\* cited by examiner

METHOD FOR OPERATING A DC-DC VOLTAGE CONVERTER APPARATUS AND CONTROL DEVICE FOR OPERATING A DC-DC VOLTAGE CONVERTER APPARATUS

CROSS REFERENCE TO RELATED APPLICATION

This application claims priority under 35 U.S.C. § 119 from German Patent Application No. 10 2021 102 261.4, filed Feb. 1, 2021, the entire disclosure of which is herein expressly incorporated by reference.

BACKGROUND AND SUMMARY OF THE INVENTION

The invention relates to a method for operating a DC-DC voltage converter apparatus having at least two DC-DC voltage converter units which, in a manner connected electrically in parallel with one another in an electrical network, are operated according to a respectively predetermined control principle. The invention furthermore relates to a control device for operating a DC-DC voltage converter apparatus of this type.

A DC-DC voltage converter unit, also referred to in the following text as DC-DC converter, is used in the electrical network, such as an on-board power supply system of a motor vehicle, for example, for the conversion of electrical DC voltage between two subsystems or network sections of the network. The two subsystems in this case have different reference potentials. That is to say an electrical DC input voltage (input voltage) from the first subnetwork is converted via an input connection of the converter into an electrical DC output voltage (output voltage) with a higher, lower or inverted voltage level for provision to the second subsystem. The conversion is effected depending on a converter topology, that is to say an interconnection of electrical components that form the converter, according to the respectively predetermined control principle.

For the purpose of conversion, in accordance with the converter topology, a converter of this kind comprises a switch arrangement, an energy transmission arrangement and a filter circuit. Through suitable operation of the switch arrangement, individual voltage pulses are formed from the DC input voltage, the individual voltage pulses being provided to the energy transmission arrangement as an AC signal for the purpose of energy transmission. To this end, the switch arrangement comprises one or more suitably interconnected electronic switches, such as semiconductor switches, for example, which are operated in a switching operation. That is to say the switches are switched according to a predetermined clock pattern, that is to say periodically, between a switched-on switching state (electrical short circuit) and a switched-off switching state (electrical open circuit). In this case, the clock pattern prescribes a duty cycle between the switched-on and the switched-off switching state and therefore a configuration, such as for instance a period length, an RMS value and/or an amplitude, of the voltage pulses. The energy transmission arrangement is operated using the voltage pulses and electrical energy, which is provided by way of the voltage pulses, is transmitted between an input side (input connection) and an output side (output connection) of the converter. In general, an interconnection of one or more energy-transmitting components, such as an electrical inductance (coil, choke), an electrical capacitance (capacitor) and/or a transformer, for example, is used for this purpose. The filter circuit is integrated into the converter topology for the purpose of filtering or smoothing the voltage, as the DC output voltage, which is provided by way of the energy transmission arrangement. This filter circuit generally comprises one or more electrical inductances and/or capacitances as filtering components, which are interconnected with one another in a suitable manner.

The setting of the desired output voltage at the output connection of the converter therefore depends on the aforementioned switching operation of the switch arrangement. The switching operation and in particular the duty cycle is prescribed or set in this case by way of the aforementioned control principle.

The publication by N. Kutkut and G. Luckjiff "Current mode control of a full bridge dc-to-dc converter with a two inductor rectifier", (PESC97. Record 28$^{th}$ Annual IEEE Power Electronics Specialists Conference. Formerly Power Conditioning Specialists Conference 1970-71. Power Processing and Electronic Specialists Conference 1972, vol. 1, pp. 203-209 vol. 1, 1997) for example discloses cascaded current-voltage control or current mode control as the predetermined control principle, that is to say what is known as current mode control (CMC) for operating a DC-DC converter. Current mode control is cascaded linear control of the output voltage using secondary current control. In this case, in order to set or adjust the output voltage of the DC-DC voltage converter unit, a respective reference current is prescribed depending on a comparison of a prescribed reference voltage with the respective output voltage. A respective setting value is then prescribed depending on a comparison of the respectively prescribed reference current with a filter current, which is tapped in the respective DC-DC voltage converter unit on the output side or the secondary side at the aforementioned electrical filter circuit for filtering the output voltage. The setting value in this case stipulates the duty cycle of the switch arrangement of the respective DC-DC voltage converter unit used for DC-DC voltage conversion.

In electrical networks, a plurality of, that is to say two or more, DC-DC voltage converter units are interconnected in an electrical parallel circuit and operated as the aforementioned DC-DC voltage converter apparatus for specific applications, such as for a scalable and/or efficient energy supply, for example.

A system of DC-DC converters connected in parallel is known from KR 10-1141038 B1, for example.

DE 10 2016 005 590 B4 accordingly also discloses a circuit having a plurality of DC-DC converters connected in parallel and the operation thereof in the circuit.

With such an interconnection, what are known as circulating currents between the converters are to be prevented when setting the output voltage of the respective converter. On account of fluctuations or changes in an electrical loading at the respective output connection (load fluctuations) and/or different connection impedances at a common node via which the converters are connected to one another in parallel, different load currents are produced at the respective output connection specifically in the case of an identically set output voltage of all of the converters. The fluctuations are caused by way of load changes of an electrical load or consumer connected to the output connection. If the converters connected in parallel are now all adjusted to an identical output voltage, what is known as the circulating current arises between the converters. This results in energy losses in the network.

In order to prevent the circulating currents, the respective output voltage of each of the converters connected in parallel is usually set or adjusted individually depending on the load currents. To this end, the load currents, in particular the values thereof, are transmitted as data between the converters. This may be effected, for example, via what is known as a data bus, that is to say a data line, between the converters. For example, the respective reference voltage for setting the output voltage is also transmitted via this data line.

A disadvantage of the transmission of the load currents via a data line for the prevention of circulating currents between converters connected in parallel is that high transmission speeds are required. Otherwise, control of the converters for setting the output voltage may become unstable.

It is an object of the invention to prevent energy losses in an electrical network having DC-DC converters connected in parallel and at the same time to provide stable control of the DC-DC converters.

This object is achieved by way of the claimed invention.

The invention is based here on the knowledge that a flow of data on the data line is to be reduced for the stable control of converters connected in parallel. If the load current is to be transmitted from a respective one of the converters to all of the other converters, specifically between a plurality of converters, losses may arise in the transition speed. Therefore, when setting the output voltage, it is not only the communication (flow of data) via the data line that should be considered. Instead, in embodiments of the invention, the aforementioned circulating currents are intended to be prevented by evaluating the output voltage of the respective converter. The invention therefore deals in particular with the control of the converters, that is to say a control method and a control device.

To this end, the parallel-connected DC-DC voltage converter units, also referred to as distributed converters in the following text, of the DC-DC voltage converter apparatus are operated in accordance with embodiments of the invention in what is known as a master/slave configuration. In this case, precisely one of the DC-DC voltage converter units is operated as master converter according to the aforementioned control principle of current mode control. The at least one further DC-DC voltage converter unit, that is to say all of the other converters of the DC-DC voltage converter apparatus, are operated as slave converters. The control principle of the slave converter or converters is likewise based here on the aforementioned current mode control. However, this is supplemented with a preconditioning function. The output voltage can be evaluated by way of this preconditioning function. To this end, in accordance with a predetermined calculation specification, on the one hand the reference voltage for operating the respective slave converter and on the other hand an operating mode of the respective slave converter is prescribed depending on the output voltage of the respective slave converter and on a master reference voltage prescribed by the master converter.

In other words, the reference voltage for setting the output voltage of the respective slave converter is produced depending on the master reference voltage. This is transmitted from the master converter to all of the slave converters and is therefore the same for all of the slave converters. In addition, the operating mode of the respective slave converter is stipulated by comparing the output voltage of the respective slave converter and the master reference voltage. Operating mode here means whether the respective slave converter is activated or deactivated and whether the respective slave converter in the activated state is operated in what is known as a buck mode, that is to say a step-down conversion operation, or what is known as a boost mode, that is to say a step-up conversion operation. In order to provide the boost mode as operating mode in addition to the buck mode, the DC-DC voltage converter units are preferably designed as bidirectional converters. The converted DC voltage can therefore be provided both by the first and the second subsystem as well as vice versa.

This results in the advantage that only the master reference voltage needs to be transmitted from the master converter to the respective slave converter via the data line. A transmission of the load currents between the converters is no longer necessary. Therefore, during operation of the distributed converters, circulating currents are prevented by virtue of it being possible to react quickly to voltage dips caused by load changes, without causing unstable control through the transmission of data via the data line.

In order to prescribe the operating mode of the respective slave converter, in one embodiment of the invention provision is made for a minimum saturation value and a maximum saturation value for the reference current of the respective slave converter to be prescribed by way of the preconditioning function in accordance with the predetermined calculation specification. These saturation values in this case limit a value that the reference current assumes at a maximum or at a minimum. The reference current is therefore adjusted to a value between the two saturation values depending on the comparison of the reference voltage and the output voltage. In this case, the saturation values are used, for example, as current control limits for what is known as an anti-windup limitation of the reference current.

The selection of the saturation values therefore sets a direction in which the load current flows between the converter and the respectively connected load. The current direction in turn prescribes the operating mode. The values that the saturation values assume in order to prescribe the operating mode depending on the calculation specification is explained in more detail further below.

How the reference current is limited by the saturation values is implemented in a further embodiment of the invention. Here, provision is made for the two saturation values to prescribe an interval for the respective reference current and for the respective reference current to be set depending on a comparison of the respective reference voltage and the respective output voltage within the interval in accordance with a predetermined assignment specification. The assignment specification therefore specifies which values the reference current can assume. For example, in accordance with the assignment specification, a linear dependency of the reference current may be produced depending on the comparison of the reference voltage and the output voltage. In this case, the value of the reference voltage cannot exceed the saturation values. Outside of the interval, that is to say when the saturation values by way of which the interval limits of the interval are prescribed are reached, the reference current would therefore be set to the prescribed maximum or minimum saturation value.

Therefore, three value ranges are specified for the reference current depending on the comparison of the reference voltage and the output voltage. Two of the value ranges are designed as what are known as saturation ranges, in which the reference current assumes the respective maximum or minimum saturation value. Between the two saturation ranges, an assignment range is provided, for example, in which the value of the reference current depends on the output voltage in comparison to the reference voltage in accordance with the predetermined assignment specification.

The following embodiments now deal with a specific implementation of the calculation specification for setting the reference voltage and the operating mode of the respective slave converter.

In one of the embodiments, three different values are provided for the reference voltage here in accordance with the calculation specification. In accordance with the calculation specification, the reference voltage of the respective slave converter is prescribed as the master reference voltage when the output voltage of the respective slave converter is greater than or equal to a prescribed lower limit value and is also lower than or equal to a prescribed upper limit value. The lower limit value results here from a difference between the master reference voltage and a prescribed deviation value. The upper limit value is formed from a sum of the master reference voltage and the prescribed deviation value.

As an alternative thereto, the reference voltage of the respective slave converter is prescribed as a difference voltage from a difference between the master reference voltage and a prescribed threshold value, and the output voltage of the respective slave converter is lower than the aforementioned lower limit value.

In contrast, if the output voltage of the respective slave converter is greater than the aforementioned upper limit value, the reference voltage of the respective slave converter is prescribed as a summation voltage from a sum of the master reference voltage and the prescribed threshold value.

The prescribed threshold value and the prescribed deviation value are in this case previously determined or stipulated voltage values that result, for example, depending on the respective converter topology. In the present case, the threshold value and the deviation value are selected in such a way that the threshold value is greater than the deviation value and both values are greater than 0. For example, a value of 0.5 V can be stipulated for the threshold value and a value of 0.3 V can be stipulated for the deviation value.

In accordance with a further one of the embodiments, analogously to this, for the setting of the respective operating mode, three different values are likewise provided in each case for the minimum and maximum saturation value of the reference current in accordance with the calculation specification. In accordance with the calculation specification, in order to prescribe the operating mode of the respective slave converter, the minimum saturation value and the maximum saturation value are both set to 0 when the output voltage of the respective slave converter is greater than or equal to the aforementioned lower limit value and at the same time the output voltage of the respective slave converter is lower than or equal to the aforementioned upper limit value. In this case, the respective slave converter would therefore be deactivated.

As an alternative thereto, the minimum saturation value is set to 0 and the maximum saturation value is set as a prescribed maximum value greater than 0 when the output voltage of the respective slave converter is lower than the aforementioned lower limit value. Therefore, the respective slave converter would thus be operated in step-down converter operation, provided the input voltage of the converter is greater than the output voltage.

In contrast, when the output voltage of the respective slave converter is greater than the aforementioned upper limit value, the minimum saturation value is set as a prescribed minimum value lower than 0 and the maximum saturation value is set to 0. In this case, the slave converter is therefore operated in step-up conversion operation, provided the input voltage is greater than the output voltage.

As described above, the threshold value and the deviation value are selected here in such a way that the threshold value is greater than the deviation value and both values are greater than 0. For example, the minimum value and the maximum value can be stipulated by way of the electronic components of the respective DC-DC voltage converter. For example, these values can be prescribed as maximum current load limits for the converter by a manufacturer.

The following embodiment relates to configuration options for implementing the aforementioned control principle. In this case, this deals in particular with how a control circuit can be realized in order to implement the control principle.

To this end, in order to implement the control principle of current mode control for the respective DC-DC voltage converter unit, provision is made for a control behavior of a cascaded control circuit arrangement to be replicated, that is to say implemented or simulated. In the present case, two control circuits that are coupled to one another in what is known as a cascade circuit are to be understood as the cascaded control circuit arrangement, specifically a leading control circuit having a leading controller or leader controller and a follower control circuit having a follower controller. In this case, the output variable of the leading controller is used as a new leader variable for the follower controller. In the control circuit according to an embodiment of the invention, the leader controller is implemented as a voltage controller and the follower controller is implemented as a current controller.

In order now to control the output voltage for the respective DC-DC voltage converter unit, a first control deviation is determined from the reference voltage as a first leader variable and from the respective output voltage as a first control variable and is provided to the voltage controller by way of the control circuit arrangement. The reference current is prescribed as a first manipulated variable depending on the first control deviation by way of the voltage controller. The reference current is assigned to the control deviation here preferably depending on the transfer function or transmission function, that is to say in particular on a control topology, of the voltage converter. As is conventional in the case of a cascaded control circuit arrangement, the reference current as the first manipulated variable is subsequently used as a new leader variable, that is to say a second leader variable for the follower controller, that is to say the current controller. A second control deviation is determined here from the reference current as a second leader variable and the respective buffer-store current as a second control variable and provided to the current controller as follower controller. The aforementioned setting value relating to the duty cycle of the switch arrangement of the respective DC-DC voltage converter unit is subsequently prescribed as a second manipulated variable depending on the second control deviation by way of the current controller. The setting value is assigned to the second control deviation here preferably depending on the transfer function or transmission function, that is to say in particular on a control topology, of the current controller. The setting value is finally used for supply to a predetermined controlled system, in order to adjust the respective output voltage as the first control variable to the respective reference voltage.

This therefore involves setting the first control deviation to 0 by way of the controlled system. This state (first control deviation=0) is also referred to as the transient state of the control circuit arrangement. How rapidly the transient state is achieved depends in particular on dynamics, that is to say a transfer function or transmission function, of the aforementioned controlled system.

In order to replicate the control behavior of the cascaded control circuit arrangement, a microcontroller can be used as control device, for example. In this case, for example, the individual control elements are implemented by way of software, that is to say program code. In addition or as an alternative, implementation in an electronic circuit comprising electronic components, such as operational amplifiers, for example, is possible in order to implement the control circuit arrangement.

In a further embodiment, in order to implement the preconditioning function for the respective slave converter, provision is made for a preconditioning element to be replicated in the control circuit arrangement. The preconditioning element is in this case connected upstream of the voltage converter in the control circuit arrangement. The respective output voltage and the master reference voltage are provided to the preconditioning element as input variables, in order to prescribe the reference voltage and the respective operating mode as output variables in accordance with the predetermined calculation specification. That is to say the preconditioning element provides the minimum saturation value and the maximum saturation value to the voltage controller in order to limit the reference current.

In accordance with a further embodiment, the voltage controller and the current controller of the control circuit arrangement are replicated as continuous-action or linear controllers. In this case, the two controllers comprise at least one proportional element and at least one integrating element. A proportional and integrative transmission behavior can therefore be realized by way of the voltage controller and the current controller. The current controller and/or the voltage controller can accordingly be replicated for example as what are known as PI controllers or as PID controllers.

The voltage controller is furthermore preferably supplemented by a limiting element, to which the saturation values are provided in order to limit the reference current and as a result the reference current is set within the interval limits prescribed by way of the saturation values in accordance with the predetermined assignment specification. The limiting element is preferably designed as what is known as an anti-windup limiting element and therefore is used to prevent what is known as the windup effect in controllers with integrative transmission behavior.

In the following embodiment, a preferred configuration of the electrical network is implemented. The electrical network is accordingly provided as an on-board power supply system of a motor vehicle having a high-voltage subsystem as a first system section and a low-voltage subsystem as a second system section. In this case, the input voltage from the high-voltage subsystem is detected or received via the respective input connection by way of the at least two DC-DC voltage converter units of the DC-DC voltage converter apparatus which are electrically connected in parallel with one another and is converted into the respective output voltage according to the predetermined control principle. The respective output voltage is then provided via a respective output connection of the DC-DC voltage converter unit to a consumer branch of the low-voltage subsystem, the consumer branch being associated with the respective DC-DC voltage converter unit.

The low-voltage subsystem is therefore divided into at least two or more consumer branches or load branches, which are each connected to one another in an electrical parallel circuit. In this case, a DC-DC voltage converter unit for converting the input voltage from the high-voltage subsystem is assigned to each consumer branch. The consumer branches here constitute the electrical load for the respective converter. These consumer branches therefore preferably comprise electronic components or component parts of the motor vehicle. For example, a consumer branch may comprise both safety-relevant and non-safety-relevant component parts. The component parts include control units, sensors, actuators and/or energy stores, for example.

Within the context of the invention, high voltage comprises DC voltages of approximately 60 V to approximately 1.5 kV. In motor vehicles, a rated voltage of approximately 400 V is often provided in a high-voltage subsystem, for example. Low voltage in the present case means DC voltages up to approximately 60 V. In a motor vehicle, a rated voltage of approximately 12 V is often provided in the low-voltage subsystem. The high-voltage subsystem and the low-voltage subsystem therefore provide different reference potentials. Converters of the DC-DC voltage converter apparatus are accordingly preferably designed as DC-isolated converters.

The invention also relates to a control device for operating a DC-DC voltage converter apparatus, as has been described above. The aforementioned control principle is preferably implemented by way of this control device. The control device can be implemented, for example, by way of a microcontroller and/or an electrical circuit arrangement. The control principle can therefore be realized, for example, by way of program code (software) and/or with the aid of electronic components. The control device is preferably used together with the aforementioned DC-DC voltage converter apparatus in an on-board power supply system for a motor vehicle. In addition, the invention can also comprise a motor vehicle having a DC-DC voltage converter apparatus of this type.

Further features of the invention may emerge from the claims, the figures and the description of the figures. The features and combinations of features mentioned above in the description and the features and combinations of features shown below in the description of the figures and/or shown in the figures alone can be used not only in the respectively stated combination, but also in other combinations or alone, without departing from the scope of the invention.

DETAILED DESCRIPTION OF THE DRAWINGS

Identical and functionally identical elements are provided with the same reference signs in the figures.

Figure 1:
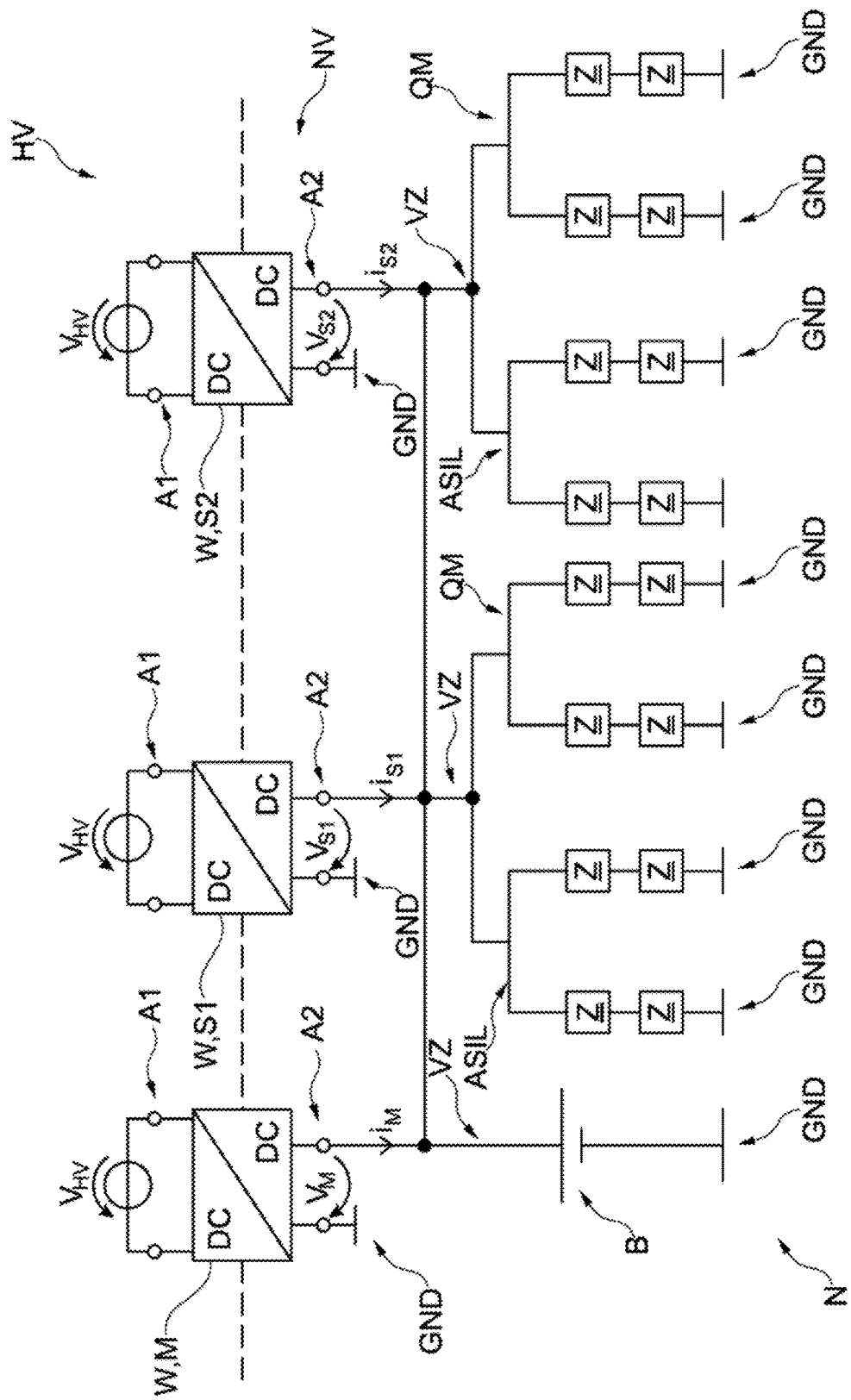
FIG. 1 shows a schematic illustration of an electrical network having a DC-DC voltage converter apparatus having three DC-DC voltage converter units which are operated in a master/slave configuration.

FIG. 1 shows a schematic illustration of an electrical network as an on-board power supply system N of a motor vehicle. The on-board power supply system is divided into two subsystems, namely a high-voltage subsystem HV and a low-voltage subsystem NV. The two subsystems have different reference potentials GND-HV, GND and as a result provide different rated voltages. The rated voltage in the high-voltage subsystem HV is 400 V, for example, and may be provided as DC voltage, for example, by a high-voltage battery of the motor vehicle. The rated voltage in the low-voltage subsystem NV is 12 V, for example. This is likewise provided as DC voltage from the high-voltage subsystem HV and is used to supply electrical energy to consumers B, Z. The consumers B, Z may be designed, for example, as a battery, a control unit, a sensor, an actuator or another predetermined electronic component part for operating the motor vehicle. As shown in FIG. 1, the consumers in the low-voltage subsystem NV are grouped into respective consumer branches VZ. The consumer branches VZ are in this case electrically connected to one another in parallel. As a result, a redundant operation of the motor vehicle may become possible, for example. In the present case, three such consumer branches VZ are illustrated by way of example. A low-voltage battery B is arranged here in one of the consumer branches VZ. The consumers Z are in turn grouped into consumer subbranches in the other two consumer branches VZ. For example, safety-relevant consumers Z are thus assigned to a respective first consumer subbranch ASIL while non-safety-relevant consumers Z are assigned to a respective second consumer subbranch QM. The acronym ASIL stands for Automotive Safety Integrity Level according to the specifications of functional safety, which is regulated in the ISO 26262 standard, for example.

In order to provide the low-voltage subsystem NV with electrical energy, for example in the form of the aforementioned rated voltage from the high-voltage subsystem HV, a DC-DC voltage converter apparatus W is used. The DC-DC voltage converter apparatus W in this case comprises at least two, that is to say two or more, DC-DC voltage converter units, which are illustrated in FIG. 1 as converters M, S1, S2. In the present case, three converters M, S1, S2 are provided by way of example. The converters are connected here in an electrical parallel circuit between the high-voltage subsystem HV and the low-voltage subsystem NV. In an interconnection of this type, the converters M, S1, S2 are also referred to as distributed converters. In this case, exactly one of the converters M, S1, S2 is assigned to each of the consumer branches VZ of the low-voltage subsystem NV. That is to say the converters M, S1, S2 are connected by way of their respective input connection A1 to the high-voltage subsystem HV. The converters M, S1, S2 are connected by way of their respective output connection A2 to the low-voltage subsystem NV and coupled here to the respectively assigned consumer branch VZ.

The function of the converters M, S1, S2 is to convert an input voltage V-HV from the high-voltage subsystem HV, which can be tapped via the respective input connection A1, into an output voltage VM, VS1, VS2, which can be tapped by the respective output connection A2. The converters M, S1, S2 are preferably designed as bidirectional converters, such that DC voltage conversion from the low-voltage subsystem NV to the high-voltage subsystem HV can also be realized. The voltages are converted depending on the respective converter topology and on a control principle according to which the converters M, S1, S2 are operated. The converter topology and the control principle will be dealt with in more detail later.

With a DC-DC voltage converter apparatus W having distributed converters M, S1, S2, it should also be noted that the respective output voltage VM, VS1, VS2 is to be set depending on a respective load current iM, iS1, iS2. In this case, that current that is provided by the respective converter M, S1, S2 to the assigned consumer branch VZ depending on the respectively applied output voltage VM, VS1, VS2 and an electrical consumption of the consumers B, Z is referred to the here as load current iM, iS1, iS2. The respective load current iM, iS1, iS2 can be tapped or measured here at the output connection A2 of the respective converter M, S1, S2. If there is a change or fluctuation in the consumption of the consumer branches VZ, specifically in the case of identically set output voltages VM, VS1, VS2, what are known as circulating currents can arise between the converters M, S1, S2 on account of the parallel circuit. In this case, the load current iM, iS1, iS2 flows from a first of the converters M, S1, S2 in the direction of the assigned consumer branch VZ while the load current iM, iS1, iS2 from another of the converters M, S1, S2 flows from the direction of the assigned consumer branch VZ to the respective output connection A2. In the present case, for example, one of the converters M, S1, S2 would therefore be operated in a step-up conversion operation (boost mode) and as a result provide electrical energy from the low-voltage subsystem NV to the high-voltage subsystem HV. At the same time, for example, another of the converters M, S1, S2 would be operated in a step-down conversion operation (buck mode) and as a result provide electrical energy from the high-voltage subsystem HV to the low-voltage subsystem NV.

In order to prevent such circulating currents between the distributed converters M, S1, S2, the respective load current iM, iS1, iS2 and the respective output voltage VM, VS1, VS2 are transmitted via a data line between the converters M, S1, S2 and are included in the conversion. That is to say the respective output voltage VM, VS1, VS2 for the respective converter is set individually depending on the load currents iM, iS1, iS2 of all of the converters M, S1, S2. In the case of a plurality of distributed converters M, S1, S2, as illustrated in FIG. 1, losses in a transmission speed and as a result unstable control of the converters M, S1, S2 for setting the respective output voltage VM, VS1, VS2 in accordance with the aforementioned control principle may arise owing to the continuous transmission of data (values of the load currents iM, iS1, iS2).

In the present case, in order to prevent energy losses on account of circulating currents and in order to achieve stable control, it is therefore proposed to operate the converters M, S1, S2 in a master/slave configuration, the control principle of which is based on what is known as current mode control. In this case, in accordance with the master/slave configuration, exactly one of the converters M, S1, S2 is operated as master converter M according to the current mode control. All of the other (in this case two) converters S1, S2 are operated as slave converters. The control principle thereof for setting the output voltage is likewise based on the current mode control. However, this is supplemented with a preconditioning function.

Figure 2:
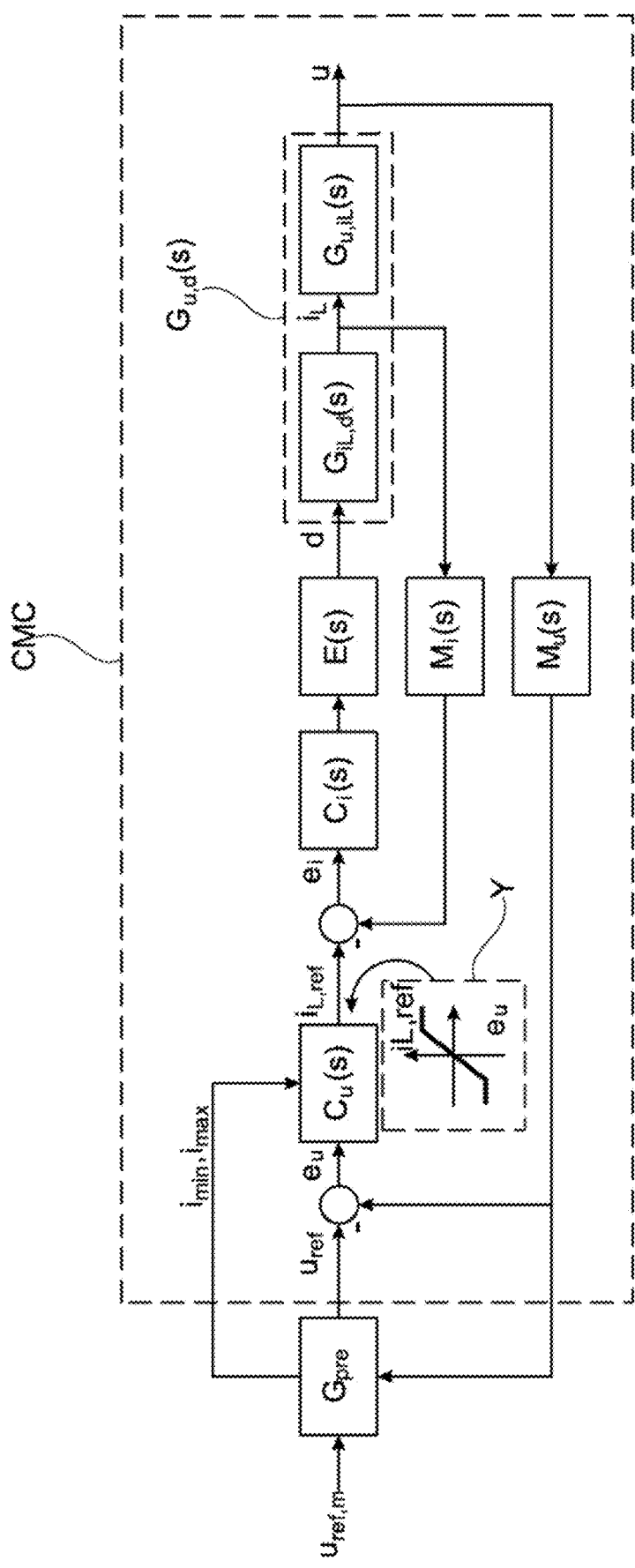
FIG. 2 shows a schematic illustration of a control circuit arrangement which is used to adjust an output voltage of the DC-DC voltage converter units that are operated in the slave configuration.

FIG. 2 in this respect shows a schematic illustration of a control circuit arrangement RK, which is used to adjust the respective output voltage VM, VS1, VS2 of the converters M, S1, S2. For the purpose of simplification, the output voltage of the control circuit arrangement RK, which corresponds to the respective output voltage VM, VS1, VS2 of the converters M, S1, S2, is denoted in the following text by the reference sign u. By way of example, the control circuit arrangement RK in accordance with FIG. 2 can be implemented by way of software (program code, data program) in a microcontroller. In addition, electronic circuits, for example an operational amplifier circuit, can also be used. In this case, the control circuit arrangement RK in FIG. 2 is based on a current-mode-control control circuit CMC for implementation of the current mode control, upstream of which a preconditioning element Gpre for implementing the preconditioning function is connected. Therefore, only the current-mode-control control circuit CMC of the control circuit arrangement RK in FIG. 2 is used to operate the master converter M. The control circuit arrangement RK as a whole, as is illustrated in FIG. 2, is used to operate the slave converters S1, S2.

The current-mode-control control circuit CMC in FIG. 2 is designed as a cascaded control circuit in order to realize the current mode control. In this case, a leading controller or leader controller, which is designed in the present case as voltage controller Cu(s), is coupled in a cascade circuit to a follower controller, which is designed in the present case as current controller Ci(s). The voltage controller Cu(s) and the current controller Ci(s) can be implemented by way of operational amplifier circuits, for example. In this case, both controllers are designed as continuous-action linear controllers with proportional-integrative transmission behavior. That is to say the controllers each have at least one proportional element and at least one integrating element. Each of the controllers can thus be realized as a PI controller or as a PID controller, for example.

In order to adjust the output voltage u, in the control circuit CMC, a first control deviation eu is initially determined from the difference between a prescribed reference voltage uref as a first leader variable and the presently measured output voltage u of the respective converter M, S1, S2 as a first control variable. The reference voltage uref in this case has a predetermined value, which may be selected, for example, based on a desired rated voltage to be set at the output connection A2. For example, the reference voltage uref can be selected according to the rated voltage of the low-voltage subsystem and can therefore be 12 V.

The first control deviation eu is then provided to the voltage controller Cu(s), by way of which a reference current iL,ref is determined therefrom as a first manipulated variable. Here, the reference current iL,ref is formed depending on the transmission behavior, that is to say on a respective transmission function, of the voltage controller Cu(s). As is conventional in a cascade circuit of controllers, the first manipulated variable is now used in turn as a second leader variable for the second controller, that is say the current controller Ci(s). In this case, a second control deviation ei is determined as a second control variable from a difference between the reference current iL,ref and a filter current iL of the respective converter M, S1, S2. The filter current iL in this case is provided at an electrical filter circuit for filtering the output voltage VM, VS1, VS2 on the output side of the respective converter M, S1, S2, that is to say in the present case on the side of the converter M, S1, S2 that is assigned to or associated with the low-voltage subsystem NV. The example of FIG. 3 will deal with the function and the structure of the filter circuit in more detail later.

The second control deviation ei is subsequently provided to the current controller Ci(s) as a second manipulated variable in order to determine a setting value d. In this case, a duty cycle of a switch arrangement Q of the respective converter M, S1, S2 is set directly or indirectly using the setting value d. The example of FIG. 3 will deal with the function and the structure of the filter circuit in more detail later. The setting value d is finally provided to a predetermined controlled system Gu,d(s), wherein the first and second control variable (output voltage u and filter current iL) are set depending on the transmission function of the controlled system for the purpose of adaptation to the respective leader variable (reference voltage uref and reference current iL,ref).

As shown in FIG. 2, the controlled system Gu,d(s) is divided into two controlled subsystems GiL,d(s) and Gu,iL(s) for this purpose. In this case, the first of the two controlled subsystems GiL,d(s) provides the filter current iL, that is to say the second control variable, as output variable depending on the transmission function thereof taking into account the setting value d. The filter current iL is provided in turn as input variable to the second of the two controlled subsystems Gu,iL(s). This second controlled subsystem provides the output voltage u, that is to say the first control variable, as output variable depending on the transmission function thereof taking into account the filter current iL. The respective transmission function or transfer function of the controlled system Gu,d(s) and of the two controlled subsystems GiL,d(s) and Gu,iL(s) results here depending on the respective converter topology of the converters M, S1, S2. The example of FIG. 3 in connection with a specific converter topology will deal with a specific configuration of the transmission functions in more detail later.

In order to replicate system-induced time delays, three delay elements are provided in the control circuit arrangement RK in FIG. 2. A first delay element E(s) in this case simulates the time delay that results when the setting value d is provided by the current controller Ci(s) to the controlled system Gu,d(s). The time delay function of the first delay element E(s) can be implemented, for example, by what is known as Padé approximation. A second delay element Mi(s) simulates the time delay that results when the filter current iL is fed back from the first controlled subsystem GiL,d(s) in order to form the second control deviation ei. A third delay element Mu(s) accordingly simulates the time delay that results when the output voltage u is fed back as output variable of the second controlled subsystem Gu,iL(s) in order to form the first control deviation eu. The second and the third delay element Mi(s), Mu(s) can therefore also be referred to as feedback delay. The system-induced time delay may be hardware-induced, for example, that is to say can result, for example, on account of measurement delays and/or calculation delays and/or transmission delays of electrical signals, such as of the output voltage u and the filter current iL.

In order to operate slave converters S1, S2, the preconditioning element Gpre for executing the preconditioning function is connected upstream of the current-mode-control control circuit CMC, as described above. In this case, the output voltage u and a predetermined master reference voltage uref,m are provided as input variables to the preconditioning element Gpre. The master reference voltage uref,m therefore has a predetermined value, which can be selected based on a desired rated voltage to be set at the output connection A2, for example. The master reference voltage uref,m can be selected according to the rated voltage of the low-voltage system NV and can therefore be 12 V, for example.

The reference voltage uref of the respective slave converter S1, S2 is set or prescribed by way of the preconditioning element Gpre depending on the output voltage u and the master reference voltage uref,m in accordance with a calculation specification prescribed by the preconditioning function. For the control of the slave converters S1, S2, the reference voltage uref is therefore no longer prescribed by the desired rated voltage, for example, but instead is determined from the master reference voltage uref,m and the output voltage u.

In addition, an operating mode of the respective slave converter S1, S2 is set or prescribed by way of the calculation specification. In this case, operating mode means a conversion principle according to which the respective converter M, S1, S2 converts a provided DC voltage into a DC voltage with a higher, lower or inverted value. The respective converter M, S1, S2 can thus be operated in accordance with the calculation specification, for example, in the step-up conversion operation (boost mode) mentioned at the beginning or in the step-down conversion operation (buck mode) mentioned at the beginning, or the converter can be transferred to a deactivated state.

In order to set the operating mode, a minimum saturation value imin and a maximum saturation value imax are provided to the voltage controller Cu(s) by the preconditioning element Gpre as current values for limiting the reference current iL,ref. The saturation values imin, imax therefore prescribe interval limits for the reference current iL,ref and are selected according to the calculation specification so that the respective operating mode results.

In order to adjust the reference current iL,ref within the interval limits, the voltage controller Cu(s) for the slave converters S1, S2 is supplemented with a limiting element Y for executing a corresponding limiting function. As shown in FIG. 2, the limiting function is based here on saturation control. That is to say the reference current iL,ref results within the interval limits depending on the first control deviation eu in accordance with a predetermined assignment specification, which is prescribed according to the control dynamics, that is to say the transmission function of the voltage controller Cu(s). As soon as a value, which the one hand either corresponds to the minimum saturation value imin or undershoots same or on the other hand either corresponds to the maximum saturation value imax or exceeds same, is stipulated for the reference current iL,ref in accordance with the assignment specification, the minimum saturation value imin or the maximum saturation value is output accordingly for the reference current iL,ref. In FIG. 2, the reference current iL,ref is assigned within the interval limits in a linear manner, that is to say in a directly proportional manner, in accordance with the calculated control deviation eu according to the assignment specification. The limiting element Y can also be used in particular to realize an anti-windup limitation in order to prevent what is known as the anti-windup effect in controllers with integrative transmission behavior.

The calculation specification according to which the reference voltage uref and the operating mode of the respective slave converter S1, S2 are prescribed by way of the two saturation values imin, imax is illustrated in the below equation (1):

$$[u_{ref}, i_{min}, i_{max}] = \begin{cases} [u_{ref,m}, 0, 0], & \text{for } u_{ref,m} - \varepsilon \leq u \leq u_{ref,m} + \varepsilon \\ [u_{ref,m} - \sigma, 0, i_{G,max}], & \text{for } u < u_{ref,m} - \varepsilon \\ [u_{ref,m} - \sigma, i_{G,min}, 0], & \text{for } u < u_{ref,m} + \varepsilon \end{cases} \quad (1)$$

When the output voltage u of the respective slave converter S1, S2 is therefore greater than or equal to a prescribed lower limit value and additionally lower than or equal to a prescribed upper limit value,
  the reference voltage uref is therefore set as the master reference voltage uref,m and
  the two saturation values imin, imax are set to 0.
The lower limit value results here from a difference between the master reference voltage uref,m and a prescribed deviation value a. The upper limit value is formed from a sum of the master reference voltage uref,m and the prescribed deviation value ε. Overall, the respective slave converter S1, S2 is therefore in the deactivated state.

In contrast, if the output voltage u is lower than the prescribed lower limit value,
  the reference voltage uref of the respective slave converter S1, S2 is set as a difference voltage from a difference between the master reference voltage uref,m and a prescribed threshold value σ,
  the minimum saturation value imin is set to 0, and
  the maximum saturation value imax is set to a prescribed maximum value iG,max.
The maximum value iG,max in this case has a value greater than 0 and is prescribed, for example, as a maximum current limit value for the operation of the slave converter S1, S2. For example, the maximum value iG,max may be 80 A. The respective slave converter S1, S2 is therefore operated in the present example in the step-down converter operation.

In contrast, if the output voltage u is greater than the prescribed upper limit value,
  the reference voltage uref of the respective slave converter S1, S2 is set as a summation voltage from a sum of the master reference voltage uref,m and the prescribed threshold value σ,
  the minimum saturation value imin is set as a prescribed minimum value iG,min, and
  the maximum saturation value imax is set to 0.
The minimum value iG,min in this case has a value lower than 0 and is prescribed, for example, as a minimum current limit value for the operation of the slave converter S1, S2. For example, the minimum value iG,min may be −80 A. The respective slave converter S1, S2 is therefore operated in the present example in the step-up converter operation.

The prescribed threshold value σ and the prescribed deviation value c are in this case previously determined or stipulated voltage values, which result depending on the respective converter topology, for example. The threshold value σ and the deviation value c are selected here in such a way that the threshold value σ is greater than the deviation value c and both values are greater than 0. For example, a value of 0.5 V can be stipulated for the threshold value σ and a value of 0.3 V can be stipulated for the deviation value ε.

In order to adjust the respective output voltage u, each slave converter S1, S2 therefore needs to be prescribed at most the master reference voltage uref,m from outside, that is to say outside of the converter topology. The master reference voltage uref,m can in this case be transmitted either between the converters M, S1, S2 via the aforementioned data line or can itself be stored as a stipulated value for each of the slave converters S1, S2. The exchange of the load current values between the converters M, S1, S2 described at the beginning can be omitted. Transmission delays are therefore prevented and at the same time stable control of the converters M, S1, S2 is ensured.

In summary, only the master reference voltage uref,m thus has to be transmitted via the data line, that is to say the data bus. The load currents iM, iS1, iS2 are disregarded. The reference voltage uref of the slave converters S1, S2 is set based on the measured output voltage u of the respective slave converter S1, S2. To this end, a power flow direction of the slave converters S1, S2 is set by way of saturation limits, that is to say the saturation values imin and imax, and therefore the operating mode of the respective slave converter S1, S2 is prescribed.

Figure 3:
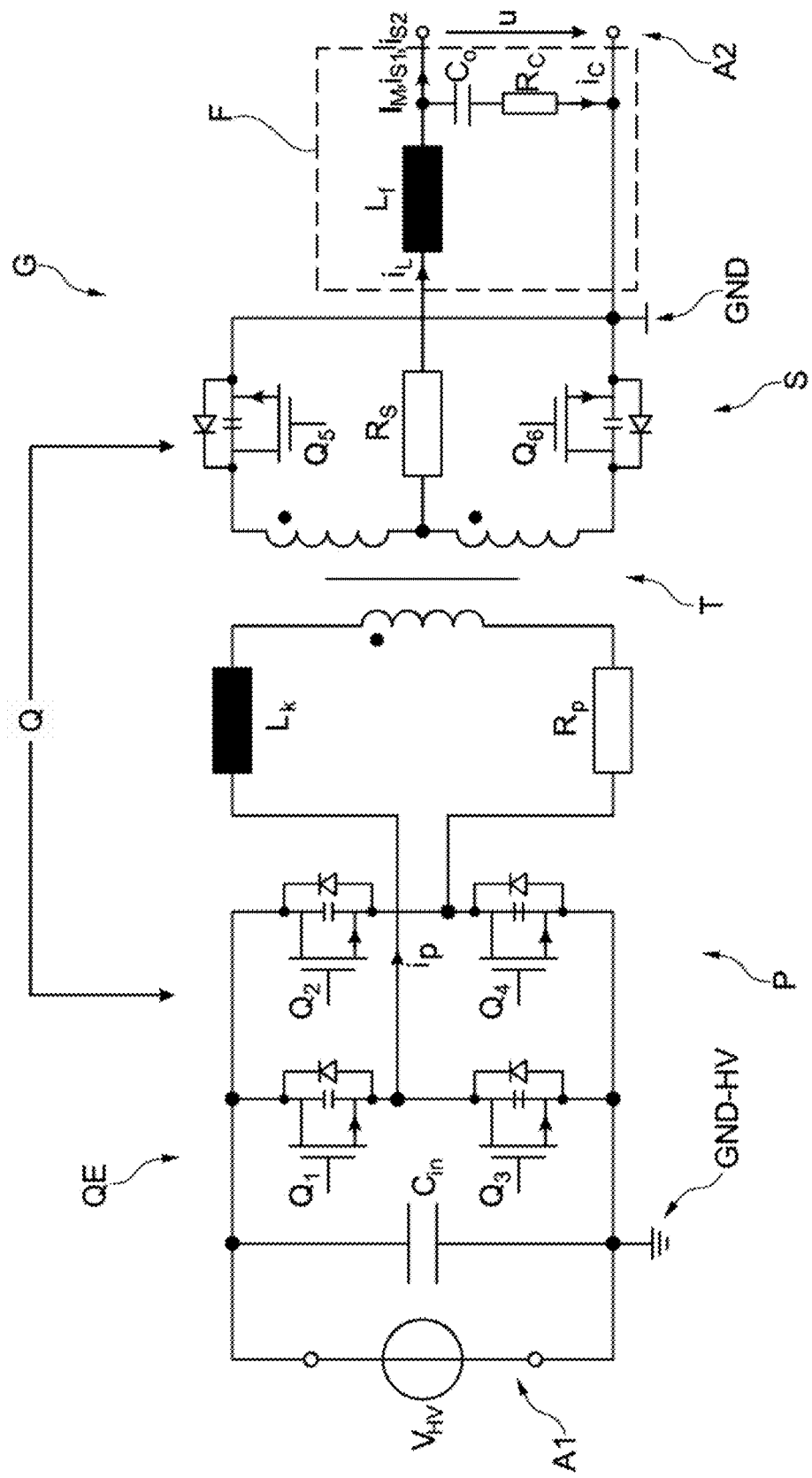
FIG. 3 shows a schematic basic circuit of a DC-DC voltage converter unit whose converter topology is based on a phase-shifted full-bridge converter topology.

A specific implementation of the transmission behavior of the control circuit arrangement RK shown in FIG. 2 is finally intended to be dealt with based on FIG. 3 using the example of a specific converter topology of the converters M, S1, S2. FIG. 3 to this end shows a schematic basic circuit, that is to say a circuit diagram of a converter, whose converter topology is based on that of a phase-shifted full-bridge converter. For the purpose of simplification, the converter in FIG. 3 is provided with the reference sign G and in this case represents the aforementioned converters M, S1, S2.

Since the high-voltage subsystem HV and the low-voltage subsystem NV in the present exemplary embodiment have different reference potentials GND-HV, GND, the converter G in the present case is designed as a DC-isolated converter having a transformer T as an energy transmission arrangement for transmitting the electrical energy between the subsystems. The converter G can be divided into an input side or primary side P and an output side or secondary side S by way of the transformer T.

The input connection A1 of the converter G, with which an electrical input capacitance Cin is electrically connected in parallel, is arranged on the primary side P. A switch unit QE is in turn likewise electrically connected in parallel with the input capacitance. The switch unit QE comprises four switches or switching elements Q1, Q2, Q3, Q4, which are interconnected with one another in a full-bridge circuit. In this case, the first switching element Q1 and the third switching element Q3 are electrically connected in series and form a first bridge branch, which is electrically connected in parallel with the input capacitance Cin. A second bridge branch comprising the second and fourth switching elements Q2, Q4 connected in series is connected in parallel with the first bridge branch. A first center tap is implemented between the two switching elements Q1, Q3 and a second center tap is implemented between the two switching elements Q2, Q4. The first center tap is connected to a first pole of a primary winding of the transformer T via what is known as a leakage inductance Lk. In this case, what is known as the leakage flux of the transformer T is simulated or replicated using the leakage inductance Lk. A choke current ip, which is consumed by the leakage inductance Lk during operation of the converter G, can be tapped at the first center tap. The choke current ip, that is to say the current flowing through the leakage inductance Lk, is also referred to as primary current. The primary winding is connected by way of its second pole to the second center tap by an electrical resistor Rp.

A secondary winding of the transformer T is divided into two winding sections on the secondary side S. This results in what is known as a center tap circuit of the secondary side S. In this case, one of the winding sections is connected by way of a first pole to a second pole of the other winding section via two further switching elements, namely a fifth and a sixth switching element Q5, Q6. One of the winding sections is connected to the first pole of the other winding section by way of the second pole. A further center tap having an electrical resistor Rs is implemented at a connection point between the two winding sections. The further center tap and a connection point between the two switching elements Q5 and Q6 form a connection for a filter arrangement F of the converter G. As an alternative to the exemplary embodiment shown in FIG. 3, the switching elements Q5 and Q6 can also be replaced by diodes, which are connected to the winding sections of the secondary winding of the transformer T in the forward direction toward the filter arrangement F. A flow of current from the winding sections in the direction of the filter arrangement F would therefore be permitted while a flow of current from the direction of the filter arrangement F to the winding sections would be blocked.

The filter arrangement F comprises a filter inductance Lf, at which the filter current iL or secondary current for setting the output voltage u of the converter G can be tapped. The filter inductance Lf is connected in series with the resistor Rs of the further center tap. The further center tap is connected to a first pole of the output connection A2 of the converter G via the filter inductance Lf and the resistor Rs. The filter circuit F furthermore comprises another filter capacitance Co, which is electrically connected in parallel with the output connection A2. The filter capacitance current ic can be tapped at the filter capacitance Co. A further electrical resistor Rc is shown in FIG. 3 electrically in series with the filter capacitance Co. The resistor Rc in this case purely symbolizes what is known as a parasitic resistor of the filter capacitance Co. The filter current iL therefore results from the sum of the respective load current iM, iS1, iS2 and the filter capacitance current ic according to what are known as Kirchhoff's laws.

In order to set the output voltage u for the converter G, the converter G is operated as a master converter M or as a slave converter S1, S2 in accordance with the control principle explained with respect to FIG. 2. In this case, the setting value d for actuating the switch arrangement Q is used as manipulated variable in accordance with the control principle. In the present case, this switch arrangement is formed by the switching elements Q1-Q6. In the present case, all of the switching elements Q1-Q6 are therefore actuated together using the setting value. The switching elements Q1, Q2, Q3, Q4, Q5 and Q6 are in this case designed as electronic switches or semiconductor switches. For example, field-effect transistors, bipolar transistors, diodes, thyristors and/or semiconductor relays can be used as semiconductor switches. FIG. 3 illustrates the switching elements Q1, Q2, Q3, Q4, Q5 and Q6 as MOSFETs (metal-oxide-semiconductor field-effect transistor), for example.

Owing to the actuation using the setting value d, the switching elements Q1-Q6 of the switch arrangement Q are operated in switching operation and in this case change between a switched-on and a switched-off switching state according to a predetermined duty cycle, that is to say in a predetermined (periodic) clock pattern. In the switched-on switching state, the switching element in this case has a low electrical resistance, with the result that a substantially unimpeded flow of current through or via the switching element is possible. In contrast, in the switched-off switching state, the switching element has a high electrical resistance, with the result that no or only a negligibly low flow of current through or via the switching element is possible. In this case, the duty cycle is prescribed directly or indirectly by the setting value. That is to say the setting value can specify the duty cycle directly or a value assigned to the duty cycle, for example.

As already described in connection with FIG. 2, the accuracy of the setting of the output voltage u to the reference voltage uref and therefore a transient behavior of the control depends on the transmission behavior of the controlled system $Gu,d(s)$ and the controlled subsystems $GiL,d(s)$ and $Gu,iL(s)$ thereof. The transmission behavior or transmission function thereof in turn depends on the converter topology of the respective converter. The transmission functions of the controlled system $Gu,d(s)$ and the controlled subsystems $GiL,d(s)$ and $Gu,iL(s)$ thereof are shown in the following equations using the example of the converter topology shown in FIG. 3.

$$G_{u,d}(s) = \frac{u}{d} = \frac{V_{HV}Z_o}{nZ_2} \frac{R_C C_o s + 1}{L_f C_o s^2 + \left(\frac{L_f}{Z_2} + Z_1 C_o\right)s + \left(\frac{Z_1}{Z_2} + \frac{Z_o^2}{Z_2^2}\right)} \quad (2)$$

$$G_{iL,d}(s) = \frac{i_p}{d} = \frac{V_{HV}}{nZ_2} \frac{Z_2 C_o s + 1}{L_f C_o s^2 + \left(\frac{L_f}{Z_2} + Z_1 C_o\right)s + \left(\frac{Z_1}{Z_2} + \frac{Z_o^2}{Z_2^2}\right)} \quad (3)$$

$$G_{u,iL}(s) = \frac{u}{i_p} = Z_o \frac{R_C C_o s + 1}{Z_2 C_o s + 1} \quad (4)$$

In the above equations, Z1 results from $$Z_1 = R_{eq} + R_{st} + \frac{Z_o R_C}{Z_o + R_C}$$

and Z2 results from $Z_2 = R_C + Z_o$, wherein $R_{st} = R_{dsONs} + R_s$ and $$R_{eq} = \frac{2L_k f_s}{n^2}.$$

In this case, fs describes a switching frequency at which the switching elements of the switch arrangement Q are switched over during switching operation. The variable Zo denotes a load impedance of the connected load, that is to say the consumer, which is connected to the output connection A2 of the converter G. The variable n denotes a turns ratio of the transformer T. The variable RdsONs denotes an electrical resistance that the switching elements Q5 and Q6 have in the switched-on switching state and therefore relates to what is known as the conductive resistances of the switching elements Q5 and Q6. The variable s constitutes a complex variable, using which a transmission function of control elements of a control circuit arrangement in the frequency range (s range) is usually described. All of the other variables of the equations (2), (3) and (4) have already been explained in connection with the figures and are therefore not explained again here.

Overall, the exemplary embodiments described with respect to the figures therefore show how, in an on-board power supply system N having distributed converters M, S1, S2, which are designed by way of example as phase-shifted full-bridge converters, stable control of the converters M, S1, S2 can be realized using a new control principle, without data needing to be exchanged continuously between the converters M, S1, S2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

A1 input connection
A2 output connection
ASIL first consumer subbranch
B battery
Co filter capacitance
Ci(s) current controller
Cin input capacitance
CMC current-mode-control control circuit
Cu(s) voltage controller
d setting value
ei second control deviation
eu first control deviation
E(s) first delay element
F filter arrangement
G converter
GiL,d(s) first controlled subsystem
Gu,d(s) controlled system
Gu,iL(s) second controlled subsystem
GND, GND-HV reference potential
Gpre preconditioning element
HV high-voltage subsystem
ic filter capacitance current
iG,max maximum value
iG,min minimum value
iL filter current
iL,ref reference current
iM, iS1, iS2 load current
imax maximum saturation value
imin minimum saturation value
ip choke current
Lf filter inductance
Lk leakage inductance
M master converter, DC-DC voltage converter unit
Mi(s) second delay element
Mu(s) third delay element
N on-board power supply system
NV low-voltage subsystem
P primary side
Q switch arrangement
Q1-Q6 switching elements
QE switch unit
QM second consumer subbranch
Rc, Rp, Rs electrical resistor
RK control circuit arrangement
S secondary side
S1, S2 slave converter, DC-DC voltage converter unit
T transistor
u output voltage
uref reference voltage
uref,m master reference voltage
VHV input voltage
VM, VS1, VS2 output voltage
VZ consumer branch
W DC-DC voltage converter apparatus
Y limiting element
Z electrical consumers
ε deviation value
σ threshold value

What is claimed is:

1. A method for operating a DC-DC voltage converter apparatus having at least two DC-DC voltage converter units connected electrically in parallel with one another in an electrical network, the method comprising:
operating the at least the DC-DC voltage converter units according to a respectively predetermined control principle, wherein the control principle is based on current mode control and, in order to set an output voltage of a respective DC-DC voltage converter unit, a respective reference current is prescribed depending on a comparison of a prescribed reference voltage with the respective output voltage, and a respective setting value is prescribed depending on a comparison of the prescribed respective reference current with a respective filter current, which in the respective DC-DC voltage converter unit is tapped on an output side at an electrical circuit for filtering the output voltage, wherein the respective setting value stipulates a duty cycle of a circuit arrangement of the respective DC-DC voltage converter unit, the circuit arrangement being used for DC-DC voltage conversion, and wherein the DC-DC voltage converter units are operated in a master/slave configuration, operating one of the DC-DC voltage converter units as a master converter according to the control principle based on the current mode control, and operating at least one further DC-DC voltage converter unit as a slave converter, according to the control principle based on the current mode control, which is supplemented with a preconditioning function, and as a result in accordance with a predetermined calculation specification a reference voltage for operating the respective slave converter and an operating mode of the respective slave converter is prescribed depending on the output voltage of the respective slave converter and a master reference voltage prescribed by the master converter.

2. The method according to claim 1, wherein, in order to prescribe the operating mode of the respective slave converter, a minimum saturation value and a maximum saturation value for the respective reference current of the respective slave converter is prescribed by the preconditioning function in accordance with the predetermined calculation specification, wherein the saturation values limit a value that the respective reference current assumes.

3. The method according to claim 2, wherein an interval for the respective reference current is prescribed by the saturation values and the respective reference current is set depending on a comparison of the respective reference voltage and the respective output voltage within the interval in accordance with a predetermined assignment specification, and the prescribed maximum or minimum saturation value is set for the respective reference current outside of the interval.

4. The method according to claim 2, wherein, in accordance with the calculation specification, in order to prescribe the operating mode of the respective slave converter:

the minimum saturation value and the maximum saturation value are both set to zero when the output voltage of the respective slave converter is greater than or equal to a lower limit value from a difference between the master reference voltage and a prescribed deviation value, and the output voltage of the respective slave converter is lower than or equal to an upper limit value from a sum of the master reference voltage and the prescribed deviation value, the minimum saturation value is set to zero and the maximum saturation value is set as a prescribed maximum value greater than zero when the output voltage of the respective slave converter is greater than the upper limit value, the minimum saturation value is set as a prescribed minimum value lower than zero and the maximum saturation voltage is set to zero when the output voltage of the respective slave converter is greater than the upper limit value, and the prescribed threshold value and the prescribed deviation value are selected in such a way that the threshold value is greater than the deviation value and both the threshold value and the deviation value are greater than zero.

5. The method according to claim 1, wherein:

in accordance with the calculation specification, the reference voltage of the respective slave converter is prescribed as the master reference voltage when the output voltage of the respective slave converter is greater than or equal to a lower limit value from a difference between the master reference voltage and a prescribed deviation value, and the output voltage of the respective slave converter is also lower than or equal to an upper limit value from a sum of the master reference voltage and the prescribed deviation value, a difference voltage from a difference between the master reference voltage and a prescribed threshold value is prescribed when the output voltage of the respective slave converter is lower than the lower limit value, a summation voltage from a sum of the master reference voltage and the prescribed threshold value is prescribed when the output voltage of the respective slave converter is greater than the upper limit value, and the prescribed threshold value and the prescribed deviation value are selected such that the threshold value is greater than the deviation value and both the threshold value and the deviation value are greater than zero.

6. The method according to claim 1, wherein:

in order to implement the control principle of the current mode control for the respective DC-DC voltage converter unit, a control behavior of a cascaded control circuit arrangement is replicated using a voltage controller as a leader controller and a current controller as a follower controller, a first control deviation is determined by the control circuit arrangement from the reference voltage as a first leader variable and from the respective output voltage as a first control variable and is provided to the voltage controller, the respective reference current is prescribed as a first manipulated variable depending on the first control deviation by the voltage controller, the respective reference current is used as a second follower variable, and a second control deviation is determined as a second control variable from the reference current and the respective filter current and is provided to the current controller, the setting value is prescribed as a second manipulated variable depending on the second control deviation by the current controller, by way of which second manipulated variable a predetermined controlled system is supplied, in order to adapt the respective output voltage as the first control variable to the respective reference voltage.

7. The method according to claim 6, wherein, in order to implement the preconditioning function for the respective slave converter, a preconditioning element is replicated in the control circuit arrangement, wherein the preconditioning element is connected upstream of the voltage converter in the control circuit arrangement, and the respective output voltage and the master reference voltage are provided to the preconditioning element as input variables, in order to prescribe the reference voltage and the respective operating mode as output variables in accordance with the calculation specification.

8. The method according to claim 6, wherein the voltage controller and the current controller as continuous-action controllers having at least one proportional element and at least one integrating element are replicated.

9. The method according to claim 1, wherein:
the electrical network is provided as an on-board power supply system having a high-voltage subsystem and a low-voltage subsystem of a motor vehicle,
an input voltage from the high-voltage subsystem is detected via a respective input connection by the at least two DC-DC voltage converter units of the DC-DC voltage converter apparatus, which DC-DC voltage converter units are electrically connected in parallel with one another, and is converted into the respective output voltage according to the predetermined control principle,
the respective output voltage is provided via a respective output connection to a consumer branch of the low-voltage subsystem, and
the consumer branch is assigned to the respective DC-DC voltage converter unit.

10. A control device for operating a DC-DC voltage converter apparatus according to the method of claim 1.

* * * * *